ns456B1

(12) United States Patent
Hecht et al.

(10) Patent No.: US 8,242,456 B1
(45) Date of Patent: Aug. 14, 2012

(54) NONCOLLIMATED 3D RADIOACTIVE SOURCE LOCALIZATION TECHNIQUE

(75) Inventors: Adam Alexander Hecht, Albuquerque, NM (US); Tyler Alecksen, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 119 days.

(21) Appl. No.: 12/965,042

(22) Filed: Dec. 10, 2010

Related U.S. Application Data

(60) Provisional application No. 61/284,075, filed on Dec. 11, 2009.

(51) Int. Cl.
  *G01J 1/42* (2006.01)
  *G01T 1/00* (2006.01)
  *G01D 18/00* (2006.01)
  *G12B 13/00* (2006.01)
(52) U.S. Cl. ..................................... 250/393; 250/252.1
(58) Field of Classification Search .................. 250/393, 250/252.1, 395; 702/28
See application file for complete search history.

(56) References Cited

U.S. PATENT DOCUMENTS

| 7,279,676 | B2 * | 10/2007 | Twomey ..................... 250/252.1 |
| 2011/0024611 | A1 * | 2/2011 | Cunningham et al. ..... 250/252.1 |
| 2011/0046478 | A1 * | 2/2011 | Kornblau et al. ............. 600/424 |

* cited by examiner

*Primary Examiner* — Jessica Stultz
*Assistant Examiner* — Edwin Gunberg
(74) *Attorney, Agent, or Firm* — MH2 Technology Law Group LLP

(57) ABSTRACT

Various embodiments provide a non-collimated 3D localization technique to detect an unknown radioactive source in a medium material using a plurality of detectors. 3D position information (x, y, z), and strength of the unknown radioactive source(s) can be determined by a comparison or a data fit between the measured detector responses with a mapping of detector responses performed with known calibration radioactive source(s). The non-collimated 3D localization technique can be used to extract lateral and depth position of contaminations in soil, concrete, or metal, to aid in monitoring and localizing radiation for nonproliferation and prevent smuggling of nuclear materials, and/or to detect and localize radioactive source(s) in medical or non-medical purposes.

30 Claims, 3 Drawing Sheets

NONCOLLIMATED 3D RADIOACTIVE SOURCE LOCALIZATION TECHNIQUE

RELATED APPLICATIONS

This application claims priority from U.S. Provisional Patent Application Ser. No. 61/284,075, filed Dec. 11, 2009, which is hereby incorporated by reference in its entirety.

DESCRIPTION OF THE INVENTION

1. Field of the Invention

This invention relates generally to detection of a radioactive source and, more particularly, to use of a non-collimated localization technique for determining position and strength information of an unknown radioactive source.

2. Background of the Invention

Conventional techniques for localizing a radioactive source include positron emission tomography (PET) and computed temomgraphy (CT). For example, with PET medical imaging, back-to-back x-rays are emitted from a source within the body which is surrounded by detectors. For CT imaging, the x-rays are emitted from a known position outside the body and fired through the body towards the detectors. In a single photon emission CT imaging (SPECT), photons may be emitted from within the body and the detector is collimated to only allow photons from the same angle to be detected.

In all these conventional techniques, the angle of photons hitting the detector must be known or set either through correlating detector pairs (e.g., for PET), or through constraining the photons emission (e.g., for CT), or through constraining the photons striking the detector (e.g., for SPECT). Additionally, collimation or restriction on the angle of radiation detected greatly lowers detection efficiency, which is unsuitable for low activity radioactive sources.

In many cases it is desirable to determine three dimensional position and source strength information without the liberty of arranging detectors around the radioactive source.

SUMMARY OF THE INVENTION

In embodiments, the present teachings include methods of detecting a radioactive source in a medium. In the methods, a mapping of detector responses based on a known radioactive source can be generated using a detector array. According to a configuration of the detector array for the mapping, a first plurality of detectors can be aligned in an x-direction and positioned relative to the medium containing an unknown radioactive source such that each detector of the first plurality of detectors measures a detector response to the unknown radioactive source. The measured detector responses of one or more detectors of the first plurality of detectors can then be compared with the mapped detector responses to determine a radioactive strength S and a z-position of the unknown radioactive source relative to the x-direction of the first plurality of detectors.

The disclosed localization technique can be used to extract position information for a source in an attenuating medium with different geometries, such as layering of attenuating media. This includes, but is not limited to, examining radioactive contamination in soil. The localization technique does not need collimation or known direction of radiation, and so the full detector geometry can be used, leading to an improvement in detection efficiency over conventional methods.

The exemplary localization technique is based on mapping detector response of a detector array as a function of detector position relative to a known source. Measuring detectors may be arrayed in different positions or the different positions of a single measuring detector may effectively act as the detector array. By examining the measured intensities in detectors at several positions, the pattern of the array response, a comparison to the mapping can be made. The source position can be obtained as where the detector response pattern best matches the mapping. This provides a fast method of finding source position without having to do computationally expensive inverse calculations as known in the art.

In embodiments, it is not the absolute number of intensity counts but the proportionality of counts between different detectors that is compared with the established calibration mapping. As such, there is a free scaling parameter in fit to the mapping from which the source strength can be directly obtained.

The disclosed localization technique can be used with a moving source relative to a detector array having a plurality of detectors, or a single detector and a moving source, or a stationary source and a moving detector, taking several measurements as a function of time. The various detector readings as a function of time can provide necessary information for comparison with the calibration mapping.

The localization technique, not based on reconstruction of projection images as in CT, PET, or SPECT imaging, can allow for source localization even if detectors are restricted to one side of the source, e.g., for examining in situ soil contaminations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
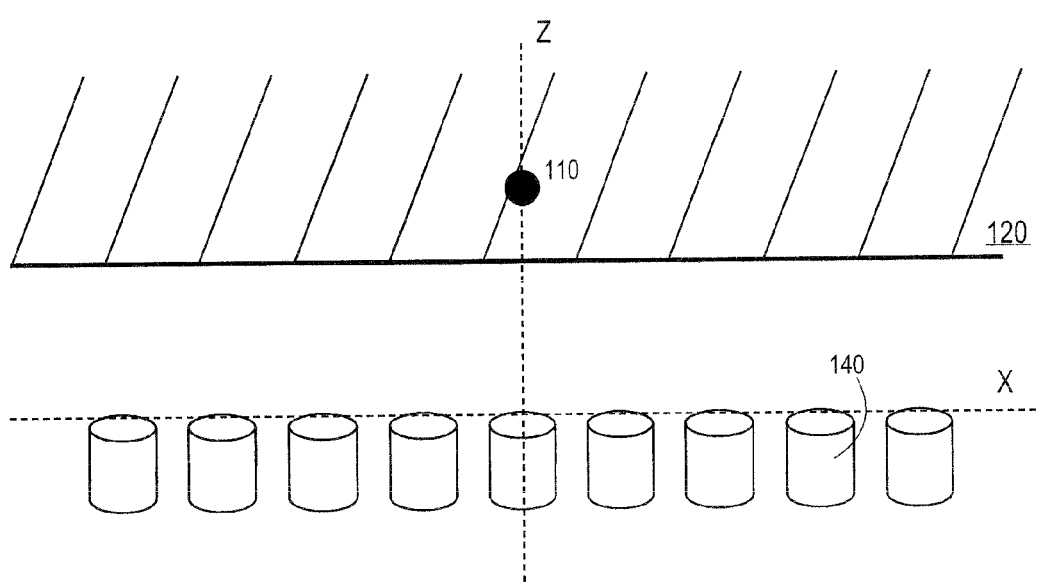
FIG. 1 depicts an exemplary configuration of detectors with respect to a source in accordance with various embodiments of the present teachings.

Reference will now be made in detail to exemplary embodiments of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Various embodiments provide a non-collimated 3D localization technique to determine a position and strength of an unknown radioactive source in a medium material using one or more detectors for detecting radioactive energy. In embodiments, the 3D position (x, y, z) including for example the depth and lateral position, and strength of the unknown radioactive source can be obtained by a comparison of detector array response curves with a previously established calibration mapping. In embodiments, the disclosed non-collimated 3D localization technique can be used, for example, to find contaminations in soil, metal, or other samples, to monitor nonproliferation and prevent smuggling of nuclear materials, and/or to detect a radioactive source in medical or non-medical purposes.

In contrast to conventional techniques, the non-collimated 3D position and strength information of an unknown radioactive source can be determined without any prior knowledge of the direction of the radiation (i.e., unlike CT or PET imaging) or collimation constraints in front of the detectors (i.e., unlike SPECT). Thus, radiation from arbitrary angles can be detected by the detector(s) with significantly increased detection efficiency. Additionally, the disclosed 3D localization technique can provide 3D position (x, y, z) information of an unknown radioactive source while conventional techniques such as CT or PET imaging techniques only provide 2D information. In those examples, information from several 2D images taken from different angles is combined to extract 3D position information. Further, in contrast to conventional medical imaging techniques which use detectors positioned all around a source, the disclosed 3D localization technique can extract 3D position without having detectors all around the radioactive source. Instead, the detector(s) can be configured as desired, e.g., over one side, over two sides, or over any number of sides of the radioactive source or the medium containing the radioactive source. Furthermore, the unknown radioactive source position information can be found within an attenuating medium such as soil or metal, rather than conventionally in human tissue. Human tissue has very little absorption of radiation in comparison.

As used herein, the term "strength" is used to describe the number of countable radioactive emissions per unit of time, such as gamma rays, although the term "strength" is commonly used to describe the number of radioactive decays per second. For illustration purposes of this disclosure, the term "radioactive source" and "source" can be used interchangeably. The term "mapping," "established mapping," "calibration mapping," and/or "established calibration mapping" can also be used interchangeably.

FIGS. 1, 2A-2B, and 3A-3B depict various exemplary configurations and methods of localizing a position and strength of an unknown radioactive source in accordance with various embodiments of the present teachings.

Generally, when isotropic detectors are used, a radioactive source at the same distance from a detector can give the same count rate, regardless of the detector orientation. When the detectors are modeled as very small, the number of counts (i.e., countable radioactive emissions) in the detector can be determined by the distance r from the source as $$I(r) = \frac{1}{r^2}.$$

For detectors aligned in a line, distributed along an x-direction as shown in FIG. 1, with a closest distance between the line and the source 110 being z, then $r^2=x^2+z^2$. As the z value increases, the number of counts in different detectors can vary slightly. Note that for z having a relative small value, the number of counts in different detectors can vary greatly, with a much greater number of counts in the closest detector than the furthest. This is illustrated in FIGS. 2A-2B with count rate instead of number of counts measured by the detectors.

In embodiments, a calibration mapping can first be determined, experimentally and/or through simulations, by using a known radioactive source detected by an array of detectors. For example, as shown in FIG. 2A, the detector responses as a function of an x-position of the aligned detectors can be noted. Additionally, a z-position of the source, i.e., the distance between the radioactive source and the x-direction line of the aligned detectors can be noted. In this illustrated example, different z values are presented as different curves 202, 204, 206 in FIG. 2A, for example, having a z value of 2 units of length, 4 units of length, and 6 units of length, respectively. FIG. 2A indicates that different z curves can be distinguished by the absolute number of counts or the count rate and also by the curvature of the detector array response lines 202, 204, 206 as a function of x-position. That is, the detector response pattern of the detector array can be distinct for each z value, which is confirmed by FIG. 2B. In FIG. 2B, the curves representing detector responses at different distance z can be scaled to have the same maximum count rate for comparison.

Figure 2A:
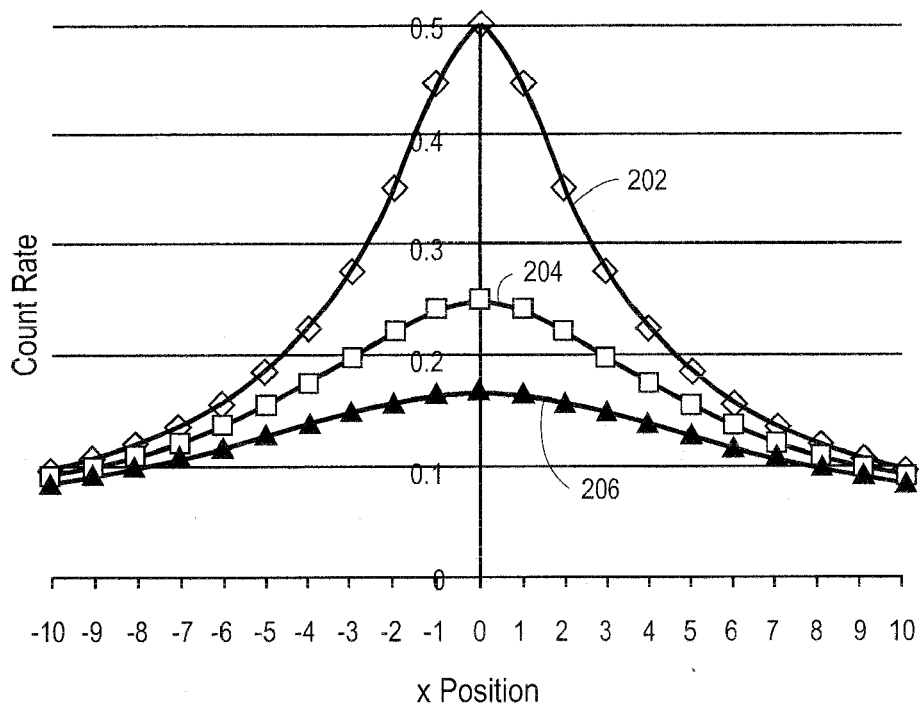
FIGS. 2A-2B depict an exemplary mapping of detector response in accordance with various embodiments of the present teachings.
Figure 2B:
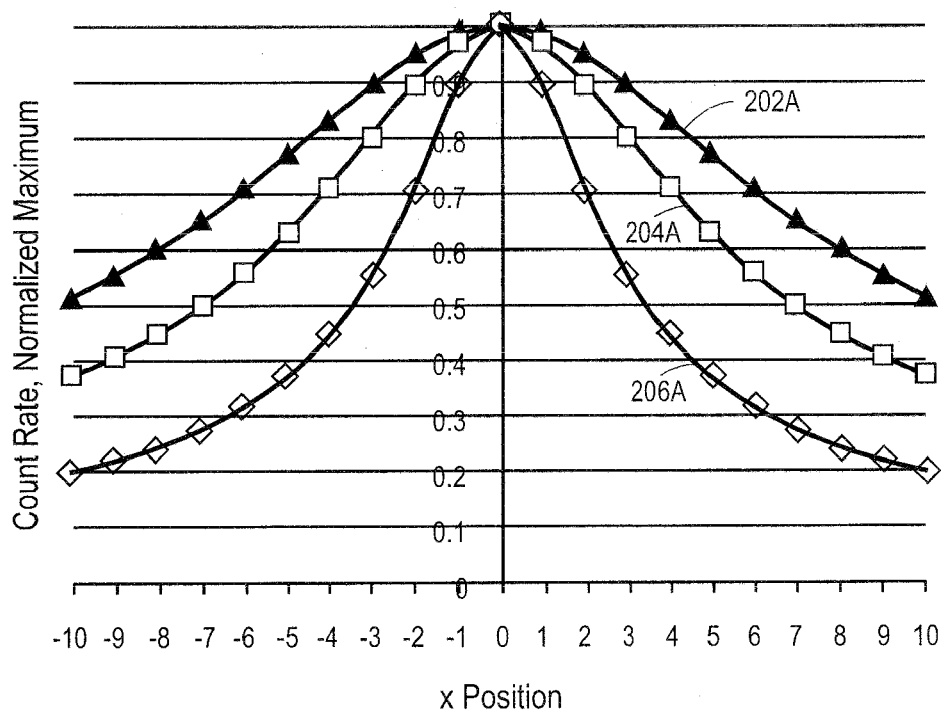

FIG. 2A shows that the detector responses of the detector array can be mapped as a function of a z-position from the source. Based on this established calibration mapping, an unknown system can be examined having a detector array or its equivalencies according to the configuration for FIG. 2A (also see FIG. 1). Detector responses or a response pattern to the unknown radioactive source can then be detected by the measuring detectors, and compared with the established mapping to find the most similar, i.e., fit, to the mapped response pattern. In some embodiments, such comparison can be performed using computing software, e.g., by a personal computer. The source distance z from the x-direction line can be extracted without any previous knowledge of the strength of the source being examined or measured. In embodiments when fewer detectors or detector positions are used than the established mapping, the fragment of the obtained curve can be compared with the mapped response curve. In embodiments, the best fit can be performed for each z curve (e.g., 202, 204, 206 in FIG. 2A), and for each x-position within each line. The x- and z-source positions relative to the detectors can then be determined.

In this manner, the fit to the detector response curve from the unknown source can use the shape of the established mapping of response curve of a known source. Therefore, the ratios of measured detector readings within a measurement set can be compared with the established mapping of the detector responses rather than the absolute values of the count rate or counts. In one embodiment, the measurements can be all multiplied by same free scaling parameter and compared with the established mapping. This free scaling parameter can vary in order to obtain the best fit. The best fit can be a best fit of x- and z-positions and of the scaling parameter, which gives the ratio of the unknown source strength to the known source strength from the established mapping. The unknown source strength can be obtained from this ratio.

Figure 3A:
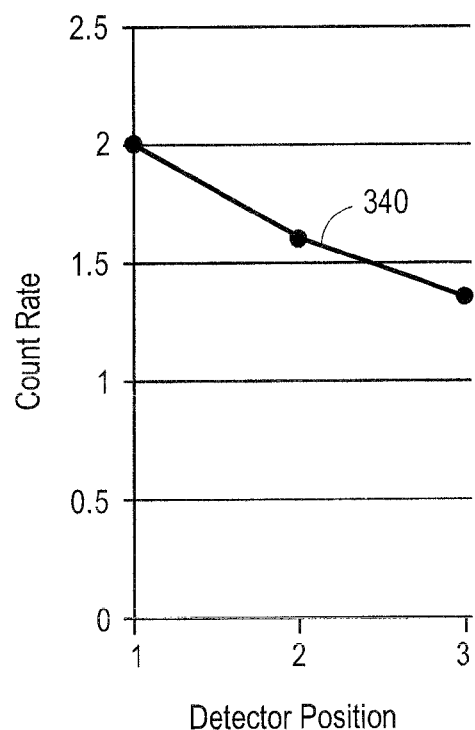
FIGS. 3A-3B depict an exemplary method for determining position and strength information of an unknown radioactive source based on the mapping of FIG. 2A in accordance with various embodiments of the present teachings.
Figure 3B:
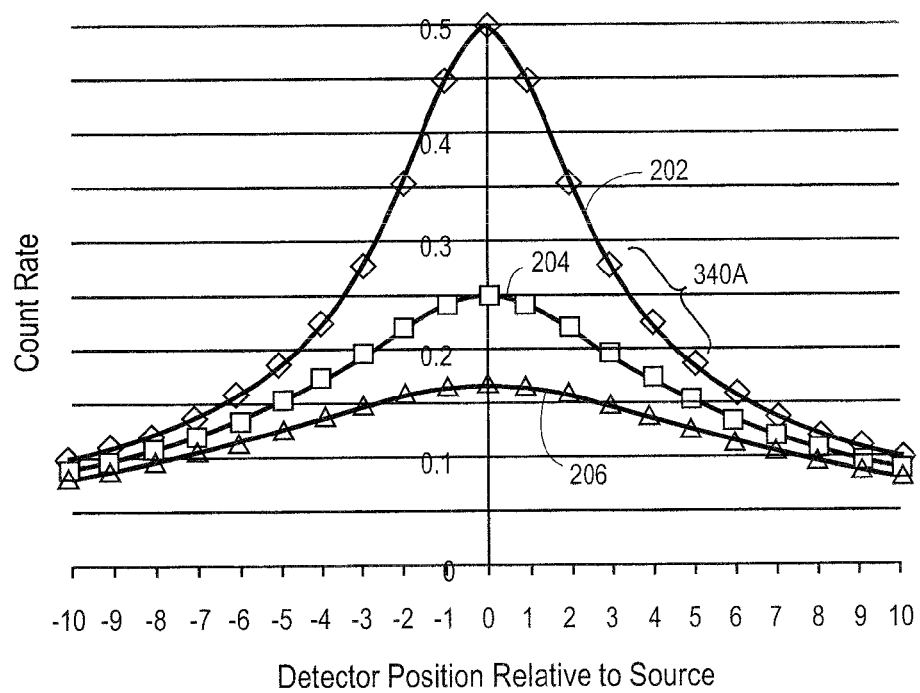

FIG. 3A depicts detector responses measured by an exemplary array of three detectors, where the detectors are spaced one unit in x apart. The detector readings can be rates of 2, 1.6, and 1.35 counts per unit of time, presented as the measured detector response curve 340. FIG. 3B presents the best fit for this exemplary array pattern. The scaled detector response curve 340a can be scaled from the curve 340 in FIG. 3A to make a good fit with one of the curves in FIG. 3B. As shown, the best fit can be on the established mapping curve 202 in the position with the left-most detector at position x=3. In this case, the fit to the mapped detector response curve 202 (i.e., for Z=2) means the source is 2 units of length away from the detectors in the z direction. The fit to x=3 for the left-most detector means the source is 3 units to the left of the left-most detector of the array. With those three points (see FIG. 3A) fit to the mapping (see FIG. 3B), the position of the radioactive source (x, z) relative to the detector array can be determined. Note that the absolute values in curve 340a are not those measured in the detector array, but the ratio is preserved. For example, the scaling factor of 0.13 can be applied in this case to the measured array response, so the unknown source strength (S) is 0.13 times the strength of the known radioactive source used for mapping. This is an example of one application of the technique of comparing detector response (s) with a calibration mapping to extract position and source strength.

As disclosed, examining the response of a row of detectors that spread out in the x-direction can give information on the lateral (x) and distal position, normal to the row of detectors, i.e., the z-position of the source with respect to the detector array, and the strength of the source (S). For obtaining the 3 points of information (x, z, S), three detector or more can be needed along the lateral (x) direction. In embodiments, more detectors may be used to reduce error in the measurements and the statistical variation.

the disclosed localization technique can include various equivalencies to methods described in FIGS. 1, 2A-2B, and 3A-3B. For example, the source in a contaminated medium material can be long lived with respect to the measuring time, so the detector count rate can be dependent on position but effectively independent of when the measurement was made at a specific position within the total measuring time. This is equivalent to use an array of detectors in different positions at the same time to determine the location of the source and to use one detector in several positions at different times. The position of the source can be extracted with respect to the position of the detector array. A moving detector can approximate a stationary detector array for the purposes of this technique. Likewise, a moving source with a single detector or array of detectors can be equivalent to a stationary source and a moving detector or array of detectors. This can be seen in examples of radiation detection with portal monitors with moving vehicles which may contain radioactive sources.

To expand the localization determination to three dimensions, at least one additional detector can be configured out of the axis of the other detectors. With reference to the original detector line along the x axis (see FIG. 1) and the distance of the source in z, and to have information on offset of the source in y-direction, additional detectors can be configured to have some offset in y-direction from the previous detector line. The lateral position of the source in (x, y) can be determined with an array spread in both x and y, and the depth of the source (z) and source strength (S) can also be extracted from the disclosed localization technique.

In one example, the mapping for a single lateral axis x can use count rate as a function of x-position, given for different source distances z, as visualized in FIG. 2A using detector response curves. In another example, the mapping for two lateral axes, x and y can use count rate as a function of x- and y-position, given for different source distances z. Detector response "surfaces" can then be plotted, and in some cases, can be shown as different height hills for the different values of z.

In some embodiments, a second plurality of detectors (not shown) can be used and aligned in a y-direction to form an (x, y) detector configuration with the first plurality of detectors (see 140 in FIG. 1). The unknown radioactive source in a medium can also be measured by one or more detectors of the second plurality of detectors having the measured detector responses compared with the mapped detector responses to determine a distal position of the unknown radioactive source relative to, e.g., normal to, the y-direction of the second plurality of detectors. Four points of information (x, y, z, S) of the unknown radioactive source can then be obtained.

In other embodiments, the mapping of detector responses based on known radioactive source(s) can be generated using a detector array having an (x, y) configuration. Accordingly, for measurements, a first plurality of detectors can be positioned in an x-direction and the second plurality of detectors can be positioned in a y-direction form the (x, y) configuration according to the detector array for mapping. The measured detector responses of one or more detectors in each direction of the first and second pluralities of detectors can then be compared with the mapped detector responses (e.g., including detector response "surfaces") to determine a 3-D (x, y, z) position of the unknown radioactive source relative to the x-direction of the first plurality of detectors and the y-direction of the second plurality of detectors.

With reference to the previously mentioned symmetries, a laterally distributed detector array can be equivalent to a single detector moved in both x- and y-directions, or an array which is moved to gather data to perform a best fit to the established calibration mapping. There are 4 points of data to find with the data fitting process (x, y, z, S), so at least four detector readings total can be needed along at least two lateral axes, x and y. More detectors can be configured to reduce source position and strength uncertainties.

Having a detector array extended in the x- and/or y-direction can be equivalent to having a single or few detectors moved in the x- and/or y-direction. The 3D localization can be performed with a single detector moved in x- and y-directions, with the technique allowing extraction of z-position as well, or with several detectors moved or stationary with positioning in x- and y-position. Multidimensional mapping can allow this technique to be applied for detectors positioned or moved in x-, y-, and z-position.

In embodiments, because comparing detector response measurements of an unknown source with a detector response mapping of a known source can be similar to using a look up table with calculations, more complicated mapping can be used as with nonisotropic detector response or with the source being within an attenuating medium, such as in FIG. 1 with the source 110 in the medium material 120. An example of nonisotropic detectors can be a flat pancake style such as FIDLER detectors used in scanning soils for radioactive contamination. These can have a much different efficiency for radiation coming from the side as from below. An example of an attenuating medium can be soil. The one exemplary application can include placing the detectors above the soil to determine where the contamination laterally is. The disclosed technique can also allow depth determination with no additional data having to be gathered. In this case, the attenuation can be considered when producing the mapping. Later data fitting process of experimental detector response curves to the calibration mapping can be performed rapidly, making it a reasonable analysis in the field. In embodiments, the disclosed position localization technique can be applied to a system having a radioactive source with nonisotropic source intensity in a nonisotropic attenuating medium using nonisotropic detectors.

The disclosed position localization technique is a contrast to conventional techniques of inverse calculations, an iterative technique in which different possible source positions are considered, and the detector responses are calculated and compared with the actual responses. If the detectors are isotropic then the count rate in any detector goes as $$I(r) = \frac{1}{r^2}$$

and simple triangulation can be used. Using an attenuating medium the detector count rate goes as $$I(r) = (\exp(-\mu R))\frac{1}{r^2},$$

where R is the photon's travel length in the medium material, and µ is a material dependent term for attenuation of photons in the material, making calculations much more involved. Furthermore, if the detector are treated more realistically and considered as nonisotropic then the calculations become even more involved. That can be computationally intensive in the field, making that inappropriate for fast work such as surveying large areas for radioactive contamination, for which the response mapping and comparison technique is much more suited.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of detecting a radioactive source in a medium comprising:
    mapping detector responses based on a known radioactive source using a detector array;
    positioning a first plurality of detectors relative to the medium containing an unknown radioactive source such that each detector of the first plurality of detectors measures a detector response to the unknown radioactive source, wherein the first plurality of detectors are aligned in an x-direction according to a configuration of the detector array for mapping; and
    comparing the measured detector responses of one or more detectors of the first plurality of detectors with the mapped detector responses to determine a radioactive strength S and a z-position of the unknown radioactive source relative to the x-direction of the first plurality of detectors.

2. The method of claim 1, wherein the comparing step further comprises determining a free scaling parameter by multiplying the measured detector responses to fit the mapped detector responses.

3. The method of claim 2, further comprising determining the radioactive strength S of the unknown radioactive source by applying the free scaling parameter to a radioactive strength of the known radioactive source.

4. The method of claim 1, wherein the first plurality of detectors comprises three or more detectors to obtain three points of information (x, z, S) of the unknown radioactive source.

5. The method of claim 1, wherein the mapping step further comprises mapping the detector responses of the known radioactive source as a function of detector position in the detector array relative to the known radioactive source.

6. The method of claim 1, wherein the measurement of the unknown radioactive source is taken as a function of time.

7. The method of claim 1, further comprising,
    positioning a second plurality of detectors aligned in a y-direction such that the first and the second pluralities of detectors have an (x, y) detector configuration,
    measuring the unknown radioactive source by one or more detectors of the second plurality of detectors,
    comparing the measured detector responses of the one or more detectors of the second plurality of detectors with the mapped detector responses to determine a distal position of the unknown radioactive source relative to the y-direction of the second plurality of detectors, and
    determining four points of information (x, y, z, S) of the unknown radioactive source.

8. The method of claim 1, further comprising,
    mapping detector responses based on the known radioactive source using a detector array having an (x, y) configuration,
    positioning a second plurality of detectors in a y-direction to form an (x, y) configuration with the first plurality of detectors, according to the (x, y) configuration of the detector array for mapping, and
    comparing the measured detector responses of one or more detectors in each direction of the first and second pluralities of detectors with the mapped detector responses to determine a 3-D (x, y, z) position of the unknown radioactive source relative to the x-direction of the first plurality of detectors and the y-direction of the second plurality of detectors.

9. The method of claim 1, wherein each of the mapping of the known radioactive source and the measurement of the unknown radioactive source is based on one or more of energy of emitted photons, an amount of the medium material that photons pass through, a strength attenuation of the medium material, a shape of each detector, efficiency of the detectors as a function of photon energy, or orientation of detectors with respect to the radioactive source.

10. A method of detecting a radioactive source in a medium comprising:
mapping detector responses based on a known radioactive source using a detector array;
positioning a first plurality of detectors, relative to the medium containing an unknown radioactive source, such that each detector of the first plurality of detectors measures a detector response to the unknown radioactive source, wherein the first plurality of detectors are aligned in an x-direction according to a configuration of the detector array for mapping;
acquiring a response ratio from the measured detector responses between two or more detectors of the first plurality of detectors; and
comparing the acquired response ratio with the mapped detector responses to determine a radioactive strength S and a z-position of the unknown radioactive source, wherein z is a distance off the x-direction of the first plurality of detectors and comprises a depth of the unknown radioactive source within the medium.

11. The method of claim 10, wherein the comparing step further comprises, plotting a response ratio curve based on the acquired response ratio, and fitting the response ratio curve to the mapped detector responses.

12. The method of claim 10, wherein the comparing step further comprises determining a free scaling parameter by multiplying the response ratios to fit the mapped detector responses.

13. The method of claim 12, further comprising determining the radioactive strength S of the unknown radioactive source by applying the free scaling parameter to a radioactive strength of the known radioactive source.

14. The method of claim 10, wherein the first plurality of detectors comprises three or more detectors to obtain three points of information (x, z, S) of the unknown radioactive source.

15. The method of claim 10, wherein the mapping step further comprises mapping the detector responses as a function of detector position in the detector array relative to the known radioactive source.

16. The method of claim 10, wherein the measurement of the unknown radioactive source is taken as a function of time.

17. The method of claim 10, wherein each of the mapping of the known radioactive source and the measurement of the unknown radioactive source is based on one or more of energy of emitted photons, an amount of the medium material that photons pass through, a strength attenuation of the medium material, a shape of each detector, efficiency of the detectors as a function of photon energy, or orientation of detectors with respect to the radioactive source.

18. The method of claim 10, further comprising,
positioning a second plurality of detectors aligned in a y-direction such that the first and the second pluralities of detectors have an (x, y) detector configuration,
measuring the unknown radioactive source by the second plurality of detectors,
acquiring a response ratio from the measured detector responses between two or more detectors of the second plurality of detectors,
comparing the acquired response ratio with the mapped detector responses to determine a distal position of the unknown radioactive source relative to the y-direction of the second plurality of detectors, and
determining four points of information (x, y, z, S) of the unknown radioactive source.

19. A method for detecting a radioactive source in a medium comprising:
mapping detector responses based on a known radioactive source using a detector array;
positioning a single detector at a first plurality of locations relative to a medium containing an unknown radioactive source such that the single detector at each location of the first plurality of locations measures a detector response to the unknown radioactive source; wherein the first plurality of locations is determined in accordance with a detector position configuration of the detector array for mapping and aligned along an x-axis direction; and
comparing the measured detector responses of the single detectors at one or more locations of the first plurality of locations with the mapped detector responses to determine a radioactive strength S and a z-position of the unknown radioactive source, wherein z is a distance off the x-axis of the first plurality of locations and comprises a depth of the unknown radioactive source within the medium.

20. The method of claim 19, further comprising determining the radioactive strength S of the unknown radioactive source by applying a free scaling parameter to a radioactive strength of the known radioactive source, wherein the free scaling parameter is determined by multiplying the measured detector responses to fit the mapped detector responses.

21. The method of claim 19, wherein the mapping step further comprises mapping the detector responses as a function of detector position in the detector array relative to the known radioactive source.

22. The method of claim 19, wherein the measurement of the unknown radioactive source by the single detector is taken as a function of time.

23. The method of claim 19, further comprising,
positioning the single detector at a second plurality of locations such that the first and the second pluralities of locations have an (x, y) configuration,
measuring the unknown radioactive source at the second plurality of locations by the single detector,
comparing the measured detector responses at one or more locations of the second plurality of locations with the mapped detector responses to determine a distal position of the unknown radioactive source relative to the y-direction of the second plurality of locations, and
determining four points of information (x, y, z, S) of the unknown radioactive source.

24. A method for detecting a radioactive source in a medium comprising:
mapping detector responses based on a known radioactive source using a detector array;
positioning a single detector at a first plurality of locations relative to a medium containing an unknown radioactive source such that the single detector at each location of the first plurality of locations measures a detector response to the unknown radioactive source; wherein the first plurality of locations is determined in accordance with a detector position configuration of the detector array for mapping and aligned along an x-axis direction;

acquiring a response ratio of the detector response from the single detector between two or more locations of the first plurality of locations; and comparing the acquired response ratio with the mapped detector responses to determine a radioactive strength S and a z-position of the unknown radioactive source, wherein z is a distance off the x-axis direction of the first plurality of locations and comprises a depth of the unknown radioactive source within the medium.

25. The method of claim 24, wherein the comparing step further comprises, plotting a response ratio curve based on the acquired response ratio, and fitting the response ratio curve to the mapped detector response.

26. The method of claim 24, further comprising determining the radioactive strength S of the unknown radioactive source by applying a free scaling parameter to a radioactive strength of the known radioactive source, wherein the free scaling parameter is determined by comparing the response ratio to fit the mapped detector responses.

27. The method of claim 24, wherein the mapping step further comprises mapping the detector responses as a function of a detector position in the detector array relative to the known radioactive source.

28. The method of claim 24, wherein the measurement of the unknown radioactive source by the single detector is taken as a function of time.

29. The method of claim 24, wherein each of the mapping of the known radioactive source and the measurement of the unknown radioactive source is based on one or more of energy of emitted photons, an amount of the medium material that photons pass through, a strength attenuation of the medium material, a shape of each detector, efficiency of the detectors as a function of photon energy, or orientation of detectors with respect to the radioactive source.

30. The method of claim 24, further comprising, positioning the single detector at a second plurality of locations in a y-direction such that the first and the second pluralities of locations have an (x, y) configuration, measuring the unknown radioactive source by the single detector at the second plurality of locations, acquiring a response ratio from the measured detector responses between two or more locations of the second plurality of locations, comparing the acquired response ratio with the mapped detector responses to determine a distal position of the unknown radioactive source relative to the y-direction of the second plurality of locations, and determining four points of information (x, y, z, S) of the unknown radioactive source.

* * * * *